United States Patent [19]

Mori et al.

[11] 4,305,492
[45] Dec. 15, 1981

[54] CLUTCH RELEASE DEVICE

[75] Inventors: Yuji Mori; Hideo Tonoki, both of Toyama, Japan

[73] Assignee: Kabushiki Kaisha Fujikoshi, Toyama, Japan

[21] Appl. No.: 124,908

[22] Filed: Feb. 26, 1980

[30] Foreign Application Priority Data

Mar. 24, 1979 [JP] Japan ............................ 54-37418[U]

[51] Int. Cl.³ ............................................. F16D 23/14
[52] U.S. Cl. ................................... 192/98; 192/110 B
[58] Field of Search ................. 192/110 B, 110 R, 98; 308/233, 232, 184 A, 26

[56] References Cited

U.S. PATENT DOCUMENTS

| 2,012,997 | 9/1935 | Junkers. | |
| 2,995,406 | 8/1961 | Pitner. | |
| 3,333,664 | 8/1967 | Chapaitis. | |
| 3,882,979 | 5/1975 | Limbacher et al. | 192/110 B X |
| 3,951,244 | 4/1976 | Neder | 192/98 |
| 4,228,881 | 10/1980 | Nakamura | 192/98 |
| 4,229,058 | 10/1980 | Arrowsmith et al. | 192/110 B |

FOREIGN PATENT DOCUMENTS 1319919 1/1963 France.

Primary Examiner—George H. Krizmanich
Attorney, Agent, or Firm—Spencer & Kaye

[57] ABSTRACT

A clutch release device for use in combination with a clutch having a declutching member that is rotatable about the axis of the clutch comprising a fixed cylindrical guide having an axis substantially coaxial with the axis of the clutch but subject to misalignment with respect thereto, and a sleeve which surrounds the guide and is slidable therealong. The sleeve is provided with an end section that extends radially outward from the sleeve. An inner ring surrounds the sleeve and is spaced radially therefrom, the inner ring also being spaced axially from the radially extending end member of the sleeve and having a driving element attached to the end opposite the end section of the sleeve for engagement with the declutching member. A housing, which surrounds the sleeve, is provided with a flange that extends radially inward between the inner ring and the end section of the sleeve, and an outer ring is secured to the inner surface of the housing opposite the inner ring and spaced therefrom to permit bearing means to be interposed between the inner and outer rings. An annular member, having a curved surface facing the flange and a plane surface facing the end section, is interposed between the housing flange and the end section of the sleeve, the annular member being movable in a radial direction while remaining in contact with the flange. Resilient means, which may be in the form of a leaf spring, is attached to the sleeve and contacts the flange to urge the flange against the curved surface of the annular member.

7 Claims, 7 Drawing Figures

CLUTCH RELEASE DEVICE

BACKGROUND OF THE INVENTION

This invention relates to a clutch release device and, in particular, to a clutch release device which compensates for angular misalignment between the rotational axis of the clutch and the rotational axis of the clutch release device.

In the construction of clutch mechanisms such as those used in automobiles, difficulty has been encountered in aligning the axis of rotation of the clutch fork or diaphragm spring with that of the clutch release device. As a practical matter, it has been found that some misalignment of these axes is generally unavoidable.

Misalignment of the axes of rotation results in radial slippage between the contacting face of the diaphragm spring and the clutch release device when the clutch is released thereby causing the contacting surfaces to wear excessively and for noise to be generated. Heating of the surfaces also occurs causing the life of the assembly to be reduced.

Attempts have been made to overcome these disadvantages, as described in British Pat. No. 1,126,058, by providing an inner bearing track which contacts the diaphragm clutch spring and is displaceable in the radial direction. Further, a clutch release device has been provided which prevents misalignment of the rotational axes by supporting an outer ring with a spring which permits the outer ring to move radially. However, these devices fail to compensate for the condition in which the axes of the clutch and clutch release device are not parallel to each other, a condition which can cause shortening of the life of the clutch release device.

SUMMARY OF THE INVENTION

An object of the present invention is to eliminate the disadvantages inherent in prior art devices by providing a clutch release device which is self-aligning and which prevents the rotational axis of the device from deviating from that of the clutch thereby extending the life of the release device.

These and other objects are attainable by the present clutch release device which is used in combination with a clutch having a declutching member that is rotatable about the axis of the clutch. The device comprises a fixed cylindrical guide having an axis substantially coaxial with the axis of the clutch but subject to misalignment with respect thereto, and a sleeve which surrounds the guide and is slidable therealong. The sleeve is provided with an end section that extends radially outward from the sleeve. An inner ring surrounds the sleeve and is spaced radially therefrom, the inner ring also being spaced axially from the radially extending end member of the sleeve and having a driving element attached to the end opposite the end section of the sleeve for engagement with the declutching member. A housing, which surrounds the sleeve, is provided with a flange that extends radially inward between the inner ring and the end section of the sleeve, and an outer ring is secured to the inner surface of the housing opposite the inner ring and spaced therefrom to permit bearing means to be interposed between the inner and outer rings. An annular member, having a curved surface facing the flange and a plane surface facing the end section, is interposed between the housing flange and the end section of the sleeve, the annular member being movable in a radial direction while remaining in contact with the flange. Resilient means, in the form of a leaf or coil spring, is attached to the sleeve and contacts the flange to urge the flange against the curved surface of the annular member.

The effect of this arrangement is to maintain the rotational axes of the clutch release device and diaphragm spring in the same line by permitting the rotatable elements of the device, including the inner ring and driving element, to move with respect to the sleeve along the curved surface of the annular member thereby compensating for discrepancies in the alignment of the axes of the clutch diaphragm spring and the release device sleeve.

BRIEF DESCRIPTION OF THE DRAWINGS

The present invention will be more fully understood by reference to the following detailed description thereof when read in conjunction with the attached drawings wherein like reference numerals refer to like elements and wherein.

DETAILED DESCRIPTION OF THE PREFERRED EMBODIMENTS

Figure 1:
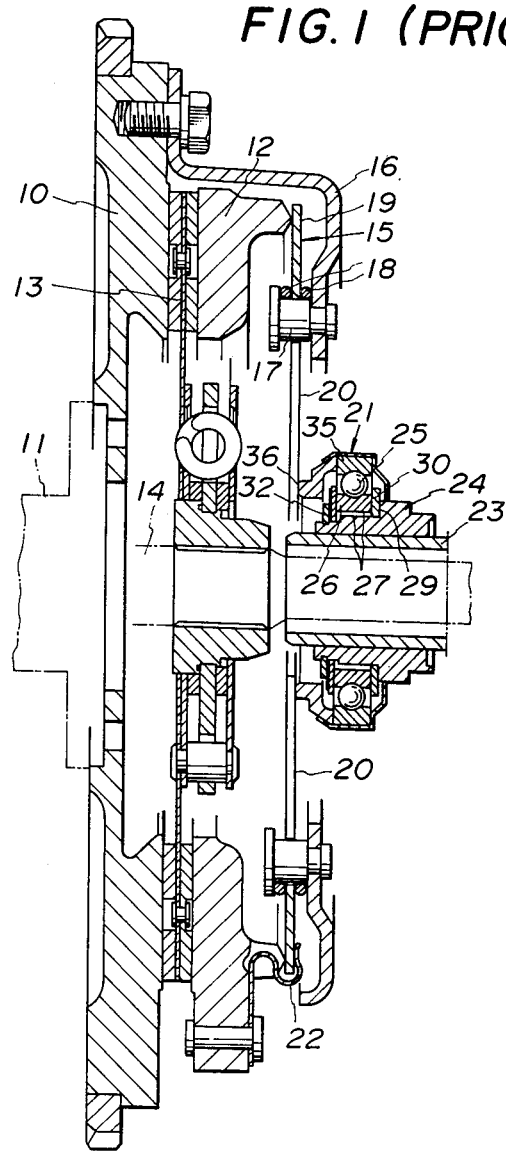
FIG. 1 is a longitudinal section of a prior art clutch and clutch release device.

FIG. 1 shows a prior art diaphragm-type clutch and clutch release device disclosed in British Pat. No. 1,126,058, which corresponds to U.S. Pat. No. 3,416,637, granted Dec. 17, 1968. The clutch per se comprises a flywheel 10 rigidly fixed to a driving shaft 11 and a pressure plate 12 movable axially with respect to the plate 10, the flywheel 10 and pressure plate 12 gripping between them a friction disc 13 which is coupled to a driven shaft 14. Pressure plate 12 cooperates with a diaphragm 15 mounted so as to rock on a cover 16 that is rigidly fixed to the flywheel 10. The assembly also comprises pillars 17 and two keeper rings 18. The peripheral portion 19 of the diaphragm 15 functions as a clamping washer and the central portion comprises a series of declutching fingers 20 cooperating with a clutch release device 21.

When the clutch release device 21 is released, that is, does not come into contact with the fingers 20, the peripheral part 19 of diaphragm 15 pushes plate 12 elastically toward flywheel 10 thereby gripping disc 13 and engaging the clutch. When device 21 acts on the fingers 20 by being displaced to the left, the diaphragm 15 is caused to rock thereby removing the elastic thrust action from plate 12. Plate 12 is then moved toward the right by stirrups 22 which are hooked onto the diaphragm 15. Thus, disc 13 is released and the clutch is disengaged.

The clutch release device 21 slides along a fixed guide 23 which is coaxial, within prescribed tolerances, with the shaft of the rotating system comprising elements 11, 10, 12, 16, 19 and 20 of the clutch. It comprises an actuating element 24 which is slidably engaged along the fixed guide 23 and is displaceable by means of a fork (not shown) and a ball bearing 25 having an inner track 26 separated radially by an annular clearance 27 from the actuating element 24. One face of track 26 acts in an axial direction against a bearing surface 29 of element 24, a friction washer 30 being interposed between track 26 and element 24. The opposite face of inner track 26 is subjected to the action of a washer 32 which is prestressed until it is flat and provides the appropriate degree of friction. An outer track 35 is provided with a driving element 36 which, when the actuating element 24 is moved along guide 23, engages the fingers 20 of diaphragm 15 thereby releasing the clutch.

In operation, if the axes of the guide 23 and the clutch are not exactly in coincidence, the driving element 36 and bearing 25 move with respect to the element 24 until the element 36 occupies a centered position with respect to the axis of the clutch. The element 36 remains in this position because of the friction grip at 30 maintained by the compression washer 32. Thus, the prior art device of FIG. 1 permits compensation for misalignment of the clutch and clutch release device axes but does not compensate for angular misalignment of these axes.

Figure 2:
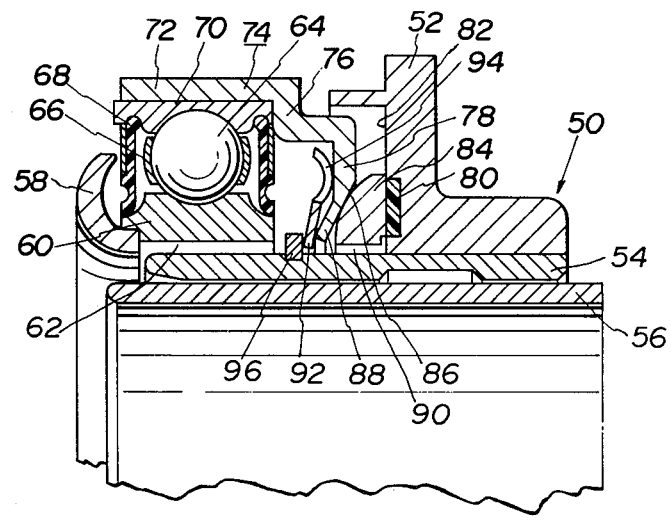
FIG. 2 is a longitudinal sectional view of a first embodiment of the clutch release device of the present invention.

An embodiment of the clutch release device of the present invention is shown in FIG. 2. It shall be understood that this device can be used in conjunction with a diaphragm-type clutch, as shown in FIG. 1, and also with other types of clutch mechanisms provided with a declutching member. The clutch release device is shown generally at 50 and includes an end member 52 adapted for axial movement by a clutch fork (not shown) or other actuating member which contacts the outer surface of the member. The end member 52 is attached to a sleeve 54 (or may be integral therewith) and extends radially therefrom, the end member 52 and sleeve 54 being slidable in the axial direction along a fixed guide 56 that is coaxial, within permissible tolerances, with the axis of the clutch. A shaft (not shown) which is connected to the clutch is located within the fixed guide 56.

The clutch release device 50 also includes a driving element 58 which, as a result of axial displacement of the end member 52 engages a declutching device, such as the diaphragm 20 of FIG. 1, or a declutching finger rotating in synchronism with the clutch about the axis of the clutch. An inner ring 60 which surrounds sleeve 54 with an axial clearance 62 supports the driving element 58 at one end. The driving element 58 may be integral with inner ring 60 or an extension may be provided on the ring for engaging the clutch diaphragm spring.

A bearing assembly consisting of ball bearings 64, bearing cage 66 and seal 68 is provided. An outer ring 70 is secured to the inner surface of the bore of a large diameter cylindrical portion 72 of a housing 74 made of steel plate. The housing 74 is provided with a smaller diameter cylindrical portion 76 and an inwardly extending flange 78 located between the rings 60, 70 and the end member 52 of sleeve 54.

A friction plate 80 is mounted in a groove in the face 82 of end member 52. This plate is preferably made of a synthetic resin, such as nylon or Teflon, having a self-lubricative action and providing a smooth, sliding surface.

Figure 7:
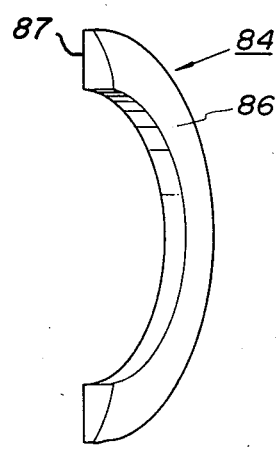
FIG. 7 is a half perspective view partially broken of an annular member used in the present invention.

An annular element 84 having a segmentally-shaped cross section with a spherical surface 86 is positioned between the end member 52 and a tapered portion 88 of the flange 78 of housing 74 adjacent the outer cylindrical surface of sleeve 54, a clearance 90 being maintained between annular member 84 and the sleeve. Since the annular member is freely movable radially within a clearance range and since it has a spherical surface, it functions as and may be called a spherical free ring, a half perspective view of which is shown in FIG. 7.

Figure 6:
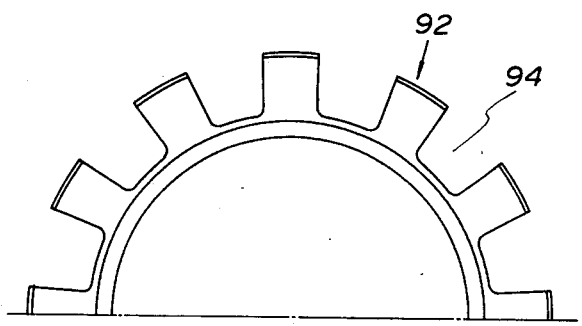
FIG. 6 is an end view of a leaf spring used in the present invention.

The inwardly extending flange 78 contacts the spherical surface 86 of the annular member or spherical free ring 84 at the inner tapered portion 88 of the outer surface of the inwardly extending flange 78. The inwardly extending flange 78 is pressed against the spherical free ring 84 which transmits this pressure to the end member 52 of sleeve 54 by means of a leaf spring 92. Spring 92 has a number of radial recesses or grooves 94 equally distributed about the spring, as shown in FIG. 6, so that the outer face of the leaf spring 92 comes into contact with the inwardly extending flange 78 in a petal-like form. A snap ring 96 positioned within a groove in sleeve 54 holds the leaf spring 92 against flange 78 of housing 74.

Figure 5:
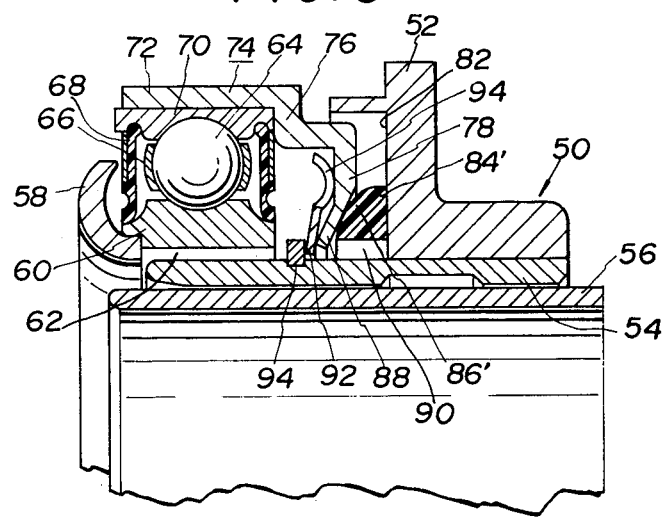
FIG. 5 is a longitudinal sectional view of still another embodiment of the invention.

This arrangement results in the spherical free ring 84 and the anti-friction plate 80 being held in contact by means of the leaf spring 92 via the housing 74. Further, the friction plate 80 may be attached to the plane side 87 of the spherical free ring 84 instead of being mounted on the end member 52. Alternatively, as shown in FIG. 5, the annular member 84' having a spherical surface 86' may be made of a synthetic resin thereby serving both as a friction plate and a spherical free ring.

As can be seen from the above description, the leaf spring 92 presses the bearing assembly and rings 60, 70 via housing 74 and spherical free ring 84 against the end section 52 thereby positioning these components. If the axis of sleeve 54 deviates from that of the diaphragm 20 (FIG. 1) which is engaged by the driving element 58 secured to inner ring 60, the spherical free ring 84 travels radially along the face of the friction plate 80 thereby eliminating any discrepancy between the clutch and inner ring axes. Also, in the event the clutch and release device axes are inclined with respect to each other due to misalignment, the inwardly extending flange 78 of housing 74 moves with a sliding motion on the spherical surface 86 of ring 84 thereby restoring the alignment of the clutch and clutch release device. The result is that slippage does not occur between the driving element 58 and the diaphragm spring 20 during rotation thereby minimizing sliding noise and unusual wear.

Figure 3:
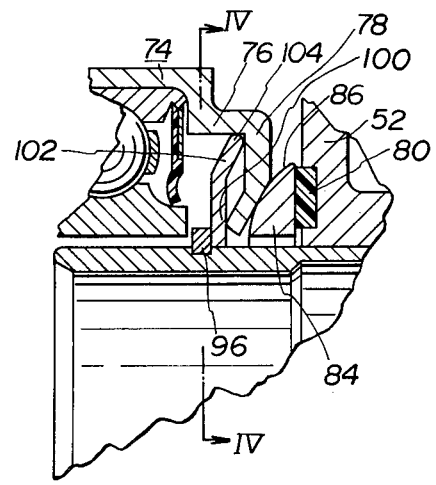
FIG. 3 is a partial longitudinal sectional view of another embodiment of the invention.
Figure 4:
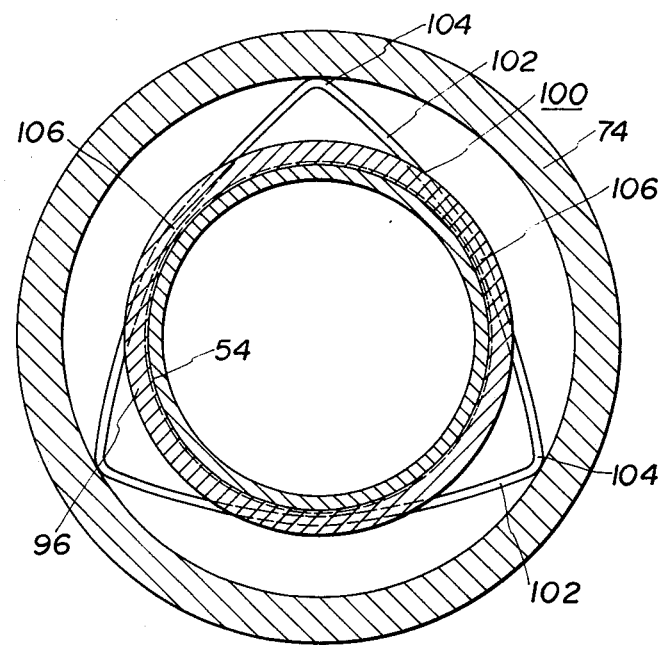
FIG. 4 is a cross-sectional view taken along the line IV—IV of FIG. 3.

In the embodiment of the invention shown in FIGS. 3 and 4, a spring 100 in the shape of an equilateral triangle replaces the leaf spring 92 in pressing the housing 74 against the spherical free ring 84. Portions 102, near the vertices 104 of the equilateral triangle, are bent toward the inwardly extending flange 78, the vertices 104 contacting both the cylindrical portion 76 of housing 74 and the inwardly extending flange 78 at a corner where the inside face of the cylindrical portion 76 joins the flange 78 to provide radial and axial thrust forces. Also, at the central portion 106 of each side of the equilateral triangle spring 100 the spring contacts the outer cylindrical surface of sleeve 54, the spring being positioned by snap ring 96. By using spring 100, the housing 74 is supported by the radial force exerted by the spring, providing a very effective means for making the outer ring 70 and sleeve 54 function as a single unit with the inwardly extending flange 78 pressed against the spherical free ring 84.

Moreover, a plate made of a synthetic resin such as nylon or teflon having a self-lubricative action or a coating of such material may be provided on the surface of housing 74 where it comes in contact with the spring 100 to enhance the wear-resistance of the release device to an even greater degree.

Summarizing, according to the present invention, the spherical free ring 84 which supports the housing 74 is easily movable radially on the smooth sliding surface provided by friction plate 80. Therefore, any discrepancy or inclination between the axis of the clutch and the release device is corrected and, at the same time, alignment of these axes is automatically assured by the spherical surface 86 of the annular member 84. Thus, the present invention entirely eliminates unnecessary slippage which might occur during rotation of the inner ring 60 and the diaphragm spring 20 as a result of a discrepancy or inclination between the rotational axes of the spring and the clutch device. Consequently, the life of the clutch release device is greatly increased. It will be seen that the inner tapered portion 88 of the in-wardly extending flange 78 may be concave along the spherical surface 86 of the annular member (84) (84') so as to secure better sliding movement therebetween.

It will be understood that the above description of the present invention is susceptible to various modifications, changes and adaptations, and the same are intended to be comprehended within the meaning and range of equivalents of the appended claims.

What is claimed is:

1. A clutch release device for use in combination with a clutch having a declutching member rotatable about the axis of said clutch, said release device comprising:
    a fixed cylindrical guide having an axis which is substantially coaxial with the axis of said clutch but which is subject to misalignment with respect thereto;
    a sleeve surrounding said guide and slidable with respect thereto, said sleeve having an end member extending radially outward therefrom;
    an inner ring surrounding said sleeve and spaced radially therefrom, said inner ring having one end spaced axially from the radially extending end member of said sleeve;
    a driving element attached to the other end of said inner ring, said driving element being engageable with said declutching member;
    a housing surrounding said sleeve, said housing having a flange extending radially inward between said inner ring and the end member of said sleeve;
    an outer ring secured to the inner surface of said housing opposite and spaced from said inner ring;
    bearing means interposed between said inner and outer rings to permit relative movement therebetween;
    an annular member interposed between said flange and said end member, said annular member having a curved surface for contacting said flange, a plane surface for contacting said end member and being movable in a radial direction, said flange being movable radially together with said annular member and being displaceable along the curved surface of said annular member when the axes of said clutch release device and said clutch are inclined with respect to each other; and
    resilient means attached to said sleeve and contacting said flange for continuously urging said flange against the curved surface of said annular member, said clutch release device compensating for lack of parallelism and angular misalignment of the axes of said clutch and said fixed cylindrical guide.

2. A clutch release device as defined by claim 1 which further comprises a friction plate forming part of said end member, said annular member sliding freely on said plate.

3. A clutch release device as defined by claim 1 wherein said annular member is composed of a synthetic resin material having a smooth surface to permit said annular member to slide freely on said end member.

4. A clutch release device as defined by claims 1 or 2 wherein said resilient means is a spring, and which further comprises a snap ring secured to the outer surface of said sleeve for supporting said spring.

5. A clutch release device as defined by claim 4 wherein said resilient means is a leaf spring having radially extending grooves on the periphery thereof.

6. A clutch release device as defined by claim 4 wherein said housing is provided with an inner cylindrical section between the portion thereof secured to said outer ring and said inwardly extending flange, and wherein said resilient means is a spring in the form of an equilateral triangle, a portion of said spring near each vertex of said equilateral triangle being bent toward said inwardly extending flange and each vertex of said spring forcibly contacting the inner cylindrical section and flange of said housing, said spring contacting the outer surface of said sleeve at the portions intermediate said vertices thereby thrusting said housing toward said annular member and radially outward to mechanically couple said sleeve and outer ring.

7. A clutch release device as defined by claim 1 wherein the curved surface of said annular member is in the shape of a portion of a sphere.

* * * * *